(12) United States Patent
Kirchhoff

(10) Patent No.: US 12,381,973 B2
(45) Date of Patent: Aug. 5, 2025

(54) DIALOG ANALYSIS USING VOICE ENERGY LEVEL

(71) Applicant: INVOCA, INC., Santa Barbara, CA (US)

(72) Inventor: Leland Kirchhoff, Santa Barbara, CA (US)

(73) Assignee: Invoca, Inc., West Hollywood, CA (US)

( * ) Notice: Subject to any disclaimer, the term of this patent is extended or adjusted under 35 U.S.C. 154(b) by 450 days.

(21) Appl. No.: 17/974,054

(22) Filed: Oct. 26, 2022

(65) Prior Publication Data

US 2024/0114090 A1 Apr. 4, 2024

Related U.S. Application Data

(60) Provisional application No. 63/333,999, filed on Apr. 22, 2022.

(51) Int. Cl.
*H04M 3/22* (2006.01)
*H04M 3/42* (2006.01)

(52) U.S. Cl.
CPC ..... *H04M 3/2218* (2013.01); *H04M 3/42221* (2013.01)

(58) Field of Classification Search
CPC .......... H04M 3/2218; H04M 3/42221
USPC ........................................ 455/414.1
See application file for complete search history.

(56) References Cited

U.S. PATENT DOCUMENTS

| | | | |
|---|---|---|---|
| 2002/0075856 A1 | 6/2002 | Leblanc | |
| 2005/0276390 A1* | 12/2005 | Sikora | H04M 3/5158 379/67.1 |
| 2011/0216905 A1* | 9/2011 | Gavalda | G10L 19/008 381/1 |
| 2022/0394442 A1 | 12/2022 | Lebeau et al. | |
| 2022/0400176 A1 | 12/2022 | Wiechman et al. | |
| 2022/0405298 A1 | 12/2022 | Wilson et al. | |
| 2022/0405802 A1 | 12/2022 | Myslinski | |
| 2022/0406309 A1 | 12/2022 | Piernot et al. | |

OTHER PUBLICATIONS

European Patent Office, Extended European Search Report for Application No. 23154254.9-1213, mailed Sep. 14, 2023, 7 pages.

* cited by examiner

*Primary Examiner* — Michael R Neff

(74) *Attorney, Agent, or Firm* — Baker Botts L.L.P.

(57) ABSTRACT

A computer-implemented method for analyzing whether a phone call is answered by a human agent. The computer-implemented method receives phone call audio data of the phone call and separates the phone call audio data into caller stream data and agent stream data that each includes a plurality of frames and calculates decibel level for each frame. In response to measuring alternating groups of frames in the caller stream data and agent stream data that exceed a dialog decibel threshold, the computer-implemented method further identifies a dialog in the phone call audio data. In response to measuring decibel levels that exceed the dialog decibel threshold in corresponding frames in both the caller stream data and agent stream data, the computer-implemented method further identifies talkover in the phone call audio data. Furthermore, in response to identifying the dialog and if a level of talkover in the phone call audio data does not exceed a talkover threshold, the computer-implemented method determines the call is answered by the human agent.

27 Claims, 5 Drawing Sheets

DIALOG ANALYSIS USING VOICE ENERGY LEVEL

BENEFIT CLAIM

This application claims the benefit under 35 U.S.C. § 119(e) of provisional application 63/333,999, filed Apr. 22, 2022, the entire contents of which are hereby incorporated herein by reference for all purposes as if fully set forth herein.

TECHNICAL FIELD

One technical field of the present disclosure is computer-implemented methods of digital signal analysis. Another technical field is software-implemented analysis of digitally stored voice call data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The analysis of the content of recorded or transcribed telephone calls using modern digital telephones, cellular radiotelephones, and voice-over-internet-protocol (VOIP) phones and devices finds widespread utility in business, government, and military applications. While computer-based chat services and websites are important in contemporary commerce, people continue to rely on voice calls to order, manage, inquire about, or request services concerning a variety of goods and services. Interactive voice response (IVR) systems have attracted wide use. Call centers staffed with large numbers of customer service agents, whether domestic or abroad, are widely used to provide service to customers of merchants and service providers. However, determining what transpired during a call can be a difficult technical problem.

Typically, artificial intelligence and machine learning techniques are used, via trained machine learning classifiers, neural networks, or Bayesian belief networks, to conduct natural language processing using call transcripts and to output topics or predictions of semantic content. While these approaches are effective, they are computationally intensive, and sometimes require large training datasets, a training phase, and feature engineering before a workable model can be deployed to evaluate call transcripts. They also require performing accurate speech-to-text conversions to prepare the transcripts, adding complexity. Thus, this technical field needs improved methods of analyzing transcripts, digital voice data, or other data derived from calls with improved efficiency and reduced computational loads.

SUMMARY

The appended claims may serve as a summary of the invention.

DETAILED DESCRIPTION

Figure 1:
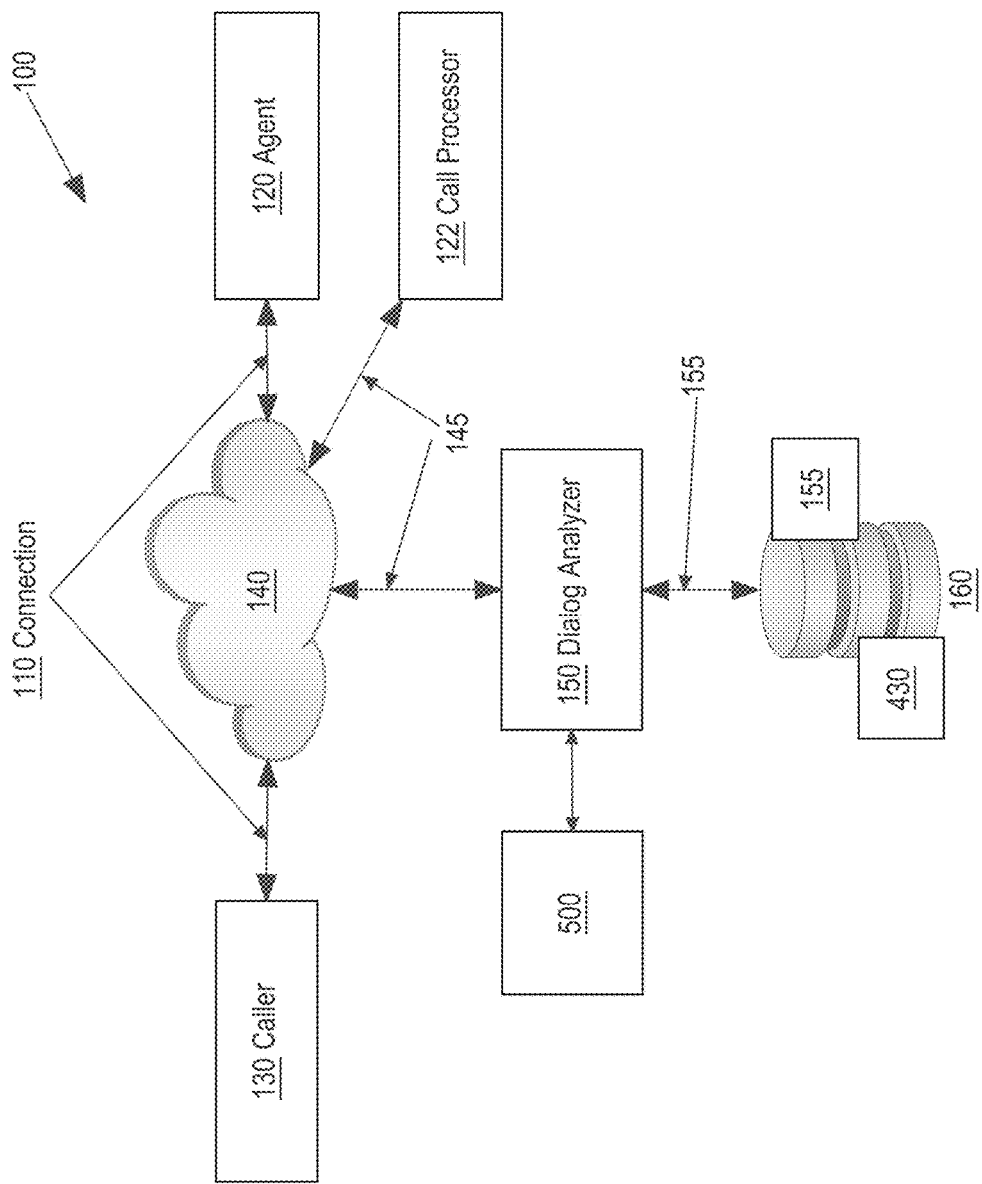
FIG. 1 illustrates a distributed computer system organized as a phone call management system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. GENERAL OVERVIEW
2. STRUCTURAL OVERVIEW
3. FUNCTIONAL OVERVIEW
4. PROCEDURAL OVERVIEW
5. IMPLEMENTATION EXAMPLE
6. HARDWARE OVERVIEW 1. General Overview In an embodiment, a computer-implemented method can be programmed for detecting the key characteristics of a voice dialog between two parties using one or more voice energy levels of the two parties. The two parties could be a caller and an agent; however, these labels are used solely to illustrate clear examples, and are not required in all embodiments. Voice energy levels can be detected using audio analysis equipment and digitally stored as decibel level values. For example, when a caller makes a phone call, the call may be answered by a human agent or sent to voicemail. Different phone calls may result in different effects on interaction between the two parties depending on if the human agent answers or does not answer the phone call. To enable analysis of the interaction after the call completes, in an embodiment, a computer-implemented method, such as a heuristic dialog analysis algorithm, may determine key characteristics of a phone call to predict what behaviors occurred during the phone call.

Embodiments can efficiently compute or measure the decibel level of each frame of audio in audio stream data. Therefore, the computer-implemented method may be efficiently applied, in terms of computational resources and direct or indirect costs of computing, to phone calls in a real-time, streaming fashion. For example, call transcription or transcription fees are not required. The inventor has measured, in experiments, an accuracy of more than 90% in predicting whether a call was answered by a human agent or sent to voicemail, depending on the characteristics of the calls for a given business.

Embodiments provide dialog analysis that can be digitally stored and presented in computer-generated reports, indirectly enabling analysts or other users to improve decision making about call routing, agent performance, and/or whether calls have been well serviced.

2. Structural Overview

Figure 2:
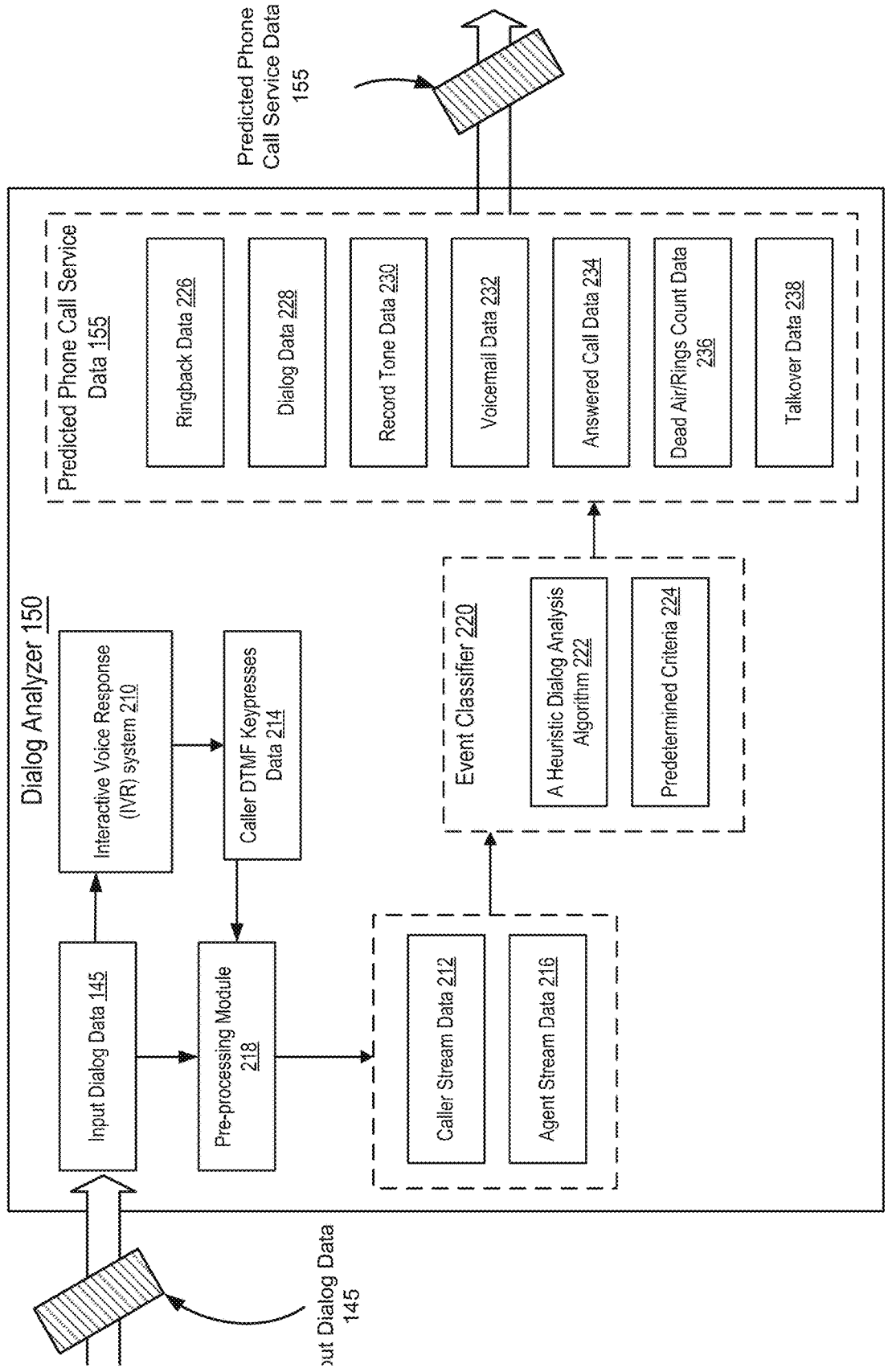
FIG. 2 shows an example of a dialog analyzer in accordance with one or more embodiments.

FIG. 1 illustrates a distributed computer system organized as a phone call management system in accordance with one or more embodiments. FIG. 2 shows an example of a dialog analyzer in accordance with one or more embodiments. For purposes of illustrating a clear example, FIG. 1 and FIG. 2 show specific configurations of components, but other configurations may be used in other embodiments. For example, components of FIG. 1 and FIG. 2 could be combined to create a single component or the functions of a single component could be implemented using two or more components.

Referring first to FIG. 1, in an embodiment, a phone call management system 100 is configured for analyzing digitally recorded data representing a voice dialog between a caller 130 and an agent 120 over a telecommunication connection 110 that can traverse a network 140. In an embodiment, a dialog analyzer 150 is communicatively coupled to network 140 and to a database 160. A call processing system 122 can be communicatively connected to the network 140 to process digital audio data flowing between the caller 130 and the agent 120 over connection 110. The call processing system 122 can be configured to pass the digital audio data asynchronously through the dialog analyzer 150 to enable the dialog analyzer to detect and record events for assessing how the call was handled. For example, the call processing system 122 can inject itself into a phone call to route the call and optionally transcribe the call and do dialog analysis. As another example, the call processing system 122 can process recordings from the digital audio data between the caller 130 and the agent 120. A computer system 500 of the kind described for FIG. 5 in other sections herein can host, execute, or control the dialog analyzer 150.

For purposes of illustrating a clear example, FIG. 1 shows two parties to a call on a single logical connection 110, but other embodiments can use any number of parties to a call and the present disclosure specifically contemplates executing with thousands to millions of callers 130 and dozens to thousands of large-scale call centers each having dozens to thousands of agents 120.

A dialog between a calling party and a called party can be characterized by the continuous flow of digital audio data with alternating raised decibel levels for digital data streams associated with the caller and the agent. In an embodiment, dialog analyzer 150 is implemented as a set of stored program instructions, in one or more non-transitory computer-readable media, which instructions can be programmed to obtain recordings of calls between caller 130 and agent 120 and to execute analytical methods under stored program control as described herein in other sections. The voice dialog on connection 110 is represented in digitally stored audio data that can be obtained from digital electronic call processing systems such as digital phone switches or digital voice recorders. In some embodiments, call recordings may be digitally stored in call processing system 122. The call processing system 122, agent 120 and dialog analyzer 150 can be within a single network domain or enterprise having shared digital storage, either on-premises or in cloud storage or online datacenters, or can be logically separated and communicatively coupled via public networks, VPNs, or other networking technology. The specific manner and location of storage of call recordings, call processing system 122, agent 120 and dialog analyzer 150 are not critical, provided that agent 120, or a computer associated with the agent, is capable of initiating a recording and digitally storing the recording in computer storage that the dialog analyzer can access, directly or indirectly via one or more networks or internetworks. For example, the call processing system 122 can process live audio stream while the call is in progress. In the live stream, the dialog analyzer 150 can be logically injected into the stream. As another example, the call processing system 122 can use recordings of the call made by a call center and the recordings can be fed directly into the dialog analyzer 150 without the call processor 122 involved. In an embodiment, the caller 130 uses a user device to initiate the dialog between the caller and the agent 120, and the agent may be the first to speak when the call is connected. The user device of caller 130 may be a conventional wireline telephone or plain old telephone system (POTS) device, a wireless phone, a cellular radiotelephone, an IP phone, a satellite phone, or a soft phone application executing in a cellular radiotelephone, smartphone, tablet computer, laptop computer, or desktop computer. Any of the foregoing elements may be communicatively coupled via any of wired or wireless telephone or internetworking links to a digital phone switch, cellular base station, or server computer, any of which is capable of recording and storing digital voice data for a call, or performing store-and-forward operations for the data. As another example, phone call management system 100 may obtain domestic or international phone calls in various networks including landline, mobile, and Voice-over-Internet-Protocol (VoIP) networks.

The agent 120 may be a human agent or a voicemail system. The agent 120 may include or comprise a conventional wireline telephone, a wireless phone, a cellular radiotelephone, an IP phone, a satellite phone, or a soft phone application executing in a cellular radiotelephone, smartphone, tablet computer, laptop computer, or desktop computer. Any of the foregoing elements may be communicatively coupled via any of wired or wireless telephone or internetworking links to a digital phone switch, cellular base station, or server computer, any of which is capable of recording and storing digital voice data for a call, or performing store-and-forward operations for the data.

The agent 120 may access the phone call management system 100 through the connection 110 to the network 140, which broadly represents any wireline or wireless network, using any of satellite or terrestrial network links, such as local area networks (LANs), metropolitan area networks (MANs), wide area networks (WANs), a public switched telephone network (PSTN), campus network, internetworks, or combinations thereof. The network 140 may include or comprise the public internet and networked server computers that implement Web2 and/or Web3 technologies. The network 140 may comprise or support intranets, extranets, or virtual private networks (VPNs). The network 140 may also comprise a public switched telephone network (PSTN) using digital switches and call forwarding gear.

The phone call management system 100 can implement an interactive voice response (IVR) server that is programmed to obtain additional information from the caller 130 to identify or clarify reasons for calling via a keypress and/or by speaking additional information which may then be passed on to the recipient provider. The phone call management system 100 may be programmed to transfer voice and keypress data via a wired or a wireless connection 110 between providers, systems, and/or subsystems of information known, accessible, and/or determined by the phone call processing system to enhance the performance of specified personnel. In various embodiments, the personnel are customer service agents or sales agents. Or, the phone call management system 100 can be programmed to interoperate with an automated system responding to customer and customer prospect inquiries to support improvements to such a system. The data transfers may execute using Session-Initiated-Protocol (SIP), Application Programmatic Interface (API) calls, or file sharing techniques.

The phone call management system 100 can be programmed to additional information in response to a receipt of an IVR selection by the caller 130 during an incoming phone call. In such an embodiment and any of the other embodiments described above, the dialog analyzer 150 can be co-located with a digital phone switch, IVR processor, IP phone switch, call manager, or other computers or appliances that receive or process digital audio from the agent 120 or caller 130. In these embodiments, the dialog analyzer 150 can execute as a standalone application on an independent computer, or can execute as an integrated application on the digital phone switch, IVR processor, IP phone switch, call manager, or other computers or appliances that receive or process digital audio from the agent 120 or caller 130. Or, the dialog analyzer 150 can execute using a virtual machine instance in a cloud-based datacenter having logical connections or programmatic connections to the digital phone switch, IVR processor, IP phone switch, call manager, or other computers or appliances that receive or process digital audio from the agent 120 or caller 130. The specific physical or logical location of the dialog analyzer 150 is not critical, provided that the dialog analyzer can interface with, or programmatically call, one or more other functional elements that receive, process, or store digital audio from connection 110.

In an embodiment, the phone call management system 100 may also comprise a dialog analyzer 150 to analyze an audio stream of connection 110 for caller 130 and agent 120 to detect key events that can be used to infer when and how the parties are interacting, if at all. Digital call data can reflect extensive variation in the quality of the audio in a phone call, in the behavior of certain events like ringing, and in how the caller and agent choose to interact. To deal with this variability, dialog analyzer 150 is programmed to create and store a plurality of different, flexible heuristics, which can be stored in a database 160 to accurately detect events in subsequent analysis operations. As described in detail in other sections herein, the heuristics are determined through the analysis of a wide variety of calls.

In an embodiment, dialog analyzer 150 is programmed to receive dialog data 145 from the network 140 and determine key characteristics of the dialog data to generate a set of predicted phone call service data 155, which can be digitally stored in the database 160. Further, dialog analyzer 150 is programmed to use the predicted phone call service data to generate a recommendation queue 430 (FIG. 4) associated with agent phone call service, phone service, network service, and IVR service.

Database 160 can comprise a relational database system, no-SQL database, object store, or flat file system, in various embodiments. Database 160 can be programmed to digitally store data in a plurality of tables, each of the tables corresponding to the data elements of predicted phone call service data 155, as further described in connection with FIG. 2.

3. Functional Overview

Referring now to FIG. 2, in one embodiment, input dialog data 145, which has been digitally encoded based on connection 110, is communicatively coupled to dialog analyzer 150. The dialog analyzer 150 comprises a pre-processing module 218 that is programmed to obtain input dialog data 145 from the network 140 for the two parties. The pre-processing module 218 may include hardware and/or software for separating the input dialog data 145 and the caller DTMF keypresses data 214 into caller stream data 212 and agent stream data 216. For example, the input dialog data 145 can have a format of 16 bit Pulse-code Modulation (PCM) with 8000 hertz (Hz) sampling rate. With the input dialog data 145 being received in frames that are $\frac{1}{50}$ second (s) in duration, the input dialog data 145 has different streams with various sources for a caller and an agent.

The pre-processing module 218 is programmed to assess the decibel level of each frame using a Root Mean Square (RMS) approach producing values in the range −127 to 0, with 0 being the highest possible volume. The pre-processing module 218 may apply one or more statistical outlier detection algorithms to remove outlier samples given that all these measurements are for physical quantities with expected efficient value ranges. Assessing a decibel level, and removing outlier samples, can be applied to both the caller stream data 212 and the agent stream data 216. For example, the pre-processing module 218 is programmed to determine the decibel level of each frame of caller stream data 212 and caller DTMF keypresses data 214 for a caller component of the input dialog data 145. As another example, the pre-processing module 218 is programmed to determine the decibel level of a different set of frames of agent stream data 216 for an agent component from the input dialog data 145.

The dialog analyzer 150 comprises an IVR system 210 that is programmed to obtain caller DTMF keypresses data 214 from input dialog data 145 for the two parties. The pre-processing module 218 is programmed to evaluate caller DTMF keypresses data 214 to distinguish whether an agent involved at a given point in a phone call is a human or an IVR system 210. The IVR system 210 is driven by the caller entering DTMF keypresses based on programmed instructions that can detect the use of an IVR. For example, the pre-processing module 218 identifies encoded data of the DTMF keypresses on the caller side when the caller enters DTMF keypresses.

However, the quality of the phone call varies based on background noise and other coherent noises. An example of another coherent noise is recorded voice interaction between the caller and another party while interacting with the IVR system 210. For voice activated IVR system 210 the interaction is similar to an interaction between two humans.

The dialog analyzer 150 may comprise an event classifier 220 that is programmed to execute a heuristic dialog analysis algorithm 222 based on predetermined criteria 224 for analyzing the audio stream for each call party to detect different key events associated with when and how the two parties are interacting, if at all. Examples of key events include ringback data 226, dialog data 228, record tone data 230, voicemail data 232, answered call data 234, dead air/rings count data 236, and talkover data 238. Digital call data can reflect extensive variation in the quality of the audio in a phone call, in how certain events like ringing behave, and in how the caller and agent choose to interact. To deal with this variability, the dialog analyzer 150 uses flexible heuristics as predetermined criteria 224 to accurately detect events. The heuristics are determined through the analysis of a wide variety of phone calls and examples are detailed in the following sections.

Database 160 can be programmed to digitally store data in a plurality of tables, each of the tables corresponding to the key events of predicted phone call service data 155. For example, each of the ringback data 226, dialog data 228, record tone data 230, voicemail data 232, answered call data 234, dead air/rings count data 236, and talkover data 238 can be stored in a different table of database 160, in which rows represent individual key events, and columns represent a start frame number and end frame number to define a particular key event. Column attributes also can include time values, decibel values, and confidence level values reflecting a level of algorithmic confidence that a key event was identified correctly.

The heuristic dialog analysis algorithm 222 is programmed to determine a key event by calculating a likelihood based on attributes, values and weights of the key event for predetermined criteria 224 associated with the dialog between the two parties. Examples of key events include a ringback event, a rings count event, a record tone event, a voicemail event, a dead air event, and a dialog event, and a talkover event. For example, a high weight may indicate a high likelihood of a particular attribute of the key event to the dialog between the two parties. In one embodiment, heuristic dialog analysis algorithm 222 calculates a likelihood P(E) of a key event E using one or more predetermined attributes based on equation 1:

$$P(E) = \frac{\sum_{1}^{N} V(i) * W(i)}{\sum_{1}^{N} W(i)} \qquad \text{Equation 1}$$

where P(E) is the likelihood of a key event E. N is the total number of attributes associated with the key event E. V(i) is a value of the i-th attribute for the key event E. W(i) is a weight associated with the i-th attribute for the key event E.

The predetermined criteria 224 may have one or more features that describe the various attributes associated with a key event. The values for a particular attribute may have one or more labels related to various categories for the particular attribute. In particular, the weight for a particular value of an attribute may be determined by previous experience or machine-learning algorithms through the analysis of a wide variety of phone calls.

In an embodiment, event classifier 220 may be programmed to apply a heuristic dialog analysis algorithm 222 based on one or more attributes to identify ringback events represented in ringback data 226 using caller stream data 212 and agent stream data 216. A ringback event is the on/off ring cycle that is played back to the caller in the audio stream by the party receiving the phone call. This ringing ends when the phone call is answered. There may be multiple sets of ringback in the input digital dialog data for a phone call. For example, if the phone call is initially answered by an IVR system 210 and then the IVR interaction results in the phone call being forwarded to a human agent, two sets of ringback event occur in the input digital dialog data. An example of the attributes, values, and weights used to calculate the weight of likelihood of a ringback event may be found in Table 1 below:

TABLE 1

EXAMPLE RINGBACK ATTRIBUTES, VALUES, AND WEIGHTS

| | Attributes | Values | Weight |
|---|---|---|---|
| 1 | Max off decibel level: −56? | No / Yes | 1 |
| 2 | Max off decibel level relaxed to −46 after first ring? | No / Yes | 1 |
| 3 | Min off ringback seconds: 0.25? | No / Yes | 1 |
| 4 | Min on decibel level: −26? | No / Yes | 1 |
| 5 | Min on ringback seconds: 0.7? | No / Yes | 1 |
| 6 | Min on ringback seconds relaxed to 0.25 after first ring? | No / Yes | 1 |
| 7 | Max on decibel level variance: 3? | No / Yes | 1 |
| 8 | Max on/off transition seconds: 0.2? | No / Yes | 1 |

Furthermore, the event classifier 220 may apply a heuristic dialog analysis algorithm 222 to identify ringback events represented in ringback data 226 using caller stream data 212 and agent stream data 216. The heuristic dialog analysis algorithm 222 may be applied to classify well-formed ringing using software analysis of the digital call data, because a sharp change will occur in the decibel level for on/off transitions. However, the intervals may be subject to a fair amount of variation. Sometimes there will only be one ring and it is very short. Regardless, heuristics can be created to accurately detect ringback using just the frame decibel levels.

The event classifier 220 may be programmed to apply a heuristic dialog analysis algorithm 222 to identify dialog and/or talkover events represented in dialog data 228 and talkover data 238 using caller stream data 212 and agent stream data 216. The event classifier 220 measures the level of talkover which is a strong indicator of a noisy phone call or the caller talking on the side to a third party. Talkover is a measure of what percentage of time both parties are simultaneously at a high decibel level. The heuristics for the detection of possible human dialog include use of a measure of the caller/agent interaction and the degree of talkover. The heuristics are only applied when there is no ringback in progress. A dialog event is detected when a caller is talking long enough and loud enough with enough variance and the agent is not talking. An example of the attributes, values, and weights used to calculate the weight of likelihood of a dialog event may be found in Table 2:

TABLE 2

ATTRIBUTES, VALUES, WEIGHTS FOR THE DIALOG HEURISTICS

| | Attributes | Values | Weight |
|---|---|---|---|
| 1 | No ringback active? | No / Yes | 1 |
| 2 | Min decibel level to consider agent or caller talking: −44? | No / Yes | 1 |
| 3 | Min decibel level to consider agent or caller talking: −44 (averaged across 50 frames for caller and 20 frames for agent)? | No / Yes | 1 |
| 4 | Min caller talk seconds: 2.25? | No / Yes | 1 |
| 5 | Min caller talk seconds: relaxed to 1.25 seconds until reach 8 seconds after last ringback or agent last talking? | No / Yes | 1 |

TABLE 2-continued

ATTRIBUTES, VALUES, WEIGHTS
FOR THE DIALOG HEURISTICS

| | Attributes | Values | Weight |
|---|---|---|---|
| 6 | Min caller decibel level variance: 5? | No<br>Yes | 1 |

Furthermore, the event classifier 220 may apply a heuristic dialog analysis algorithm 222 to identify voicemail events represented in voicemail data 232 using caller stream data 212 and agent stream data 216. During a phone call it may be that the party being called is not available and the caller is then sent to voicemail to record a message. There are also cases where a human agent answers the phone call but then the agent transfers to a third party that is not available, and the phone call transfers to voicemail. There are two strong indicators of a phone call going to voicemail: one indicator is the caller decibel level remains high while the agent side is silent when at the end of the call; the other indicator is a record tone. Both of the indicators have different challenges to detect accurately which requires heuristics to accurately distinguish the situation because of inconsistency in the length or decibel level of a record tone. A record tone is generally shorter than a ringback but in some cases it is similar to a ringback event, especially a ringback event that is cutoff quickly because the agent answered. An example of the attributes, values, and weights used to calculate the weight of likelihood of a record tone event may be found in Table 3:

TABLE 3

ATTRIBUTES, VALUES, WEIGHTS FOR
THE RECORD TONE HEURISTICS

| | Attributes | Values | Weight |
|---|---|---|---|
| 1 | No ringback active within 3 seconds? | No<br>Yes | 1 |
| 2 | Decibel level range: −33 to −6? | No<br>Yes | 1 |
| 3 | Decibel level range: −33 to −6 (averaged across 5 frames)? | No<br>Yes | 1 |
| 4 | Max decibel level variance: 1? | No<br>Yes | 1 |
| 5 | Tone duration range seconds: 0.14 to 0.7? | No<br>Yes | 1 |
| 6 | Max on transition seconds: 0.25? | No<br>Yes | 1 |
| 7 | No caller activity greater than −30 decibels for 2 seconds prior to tone? | No<br>Yes | 1 |

In some systems, an IVR dialog may occur after a caller leaves a voicemail; for example, the IVR dialog can accept signals from the caller to replay, cancel, or amend the message. The existence of such IVR functions eliminates the condition that the agent side is silent. Usually this IVR involves the caller signaling actions via DTMF keypresses, so the availability of DTMF keypress information is valuable for accurate detection of a voicemail. In an embodiment, the event classifier 220 is programmed to classify a voicemail event based on heuristics associated with the length and decibel level, as well as the proximity of the possible tone to other activity, such as the agent speaking. For example, the event classifier 220 can be programmed to logically determine events in four different scenarios to predict whether the phone call is sent to voicemail and whether a message is left:

1. A voicemail message is present when the event classifier 220 detects a record tone near the end of the phone call that does not align with a ringback, a long enough caller monologue occurs at the end of the call, and no trailing agent activity occurs.
2. A voicemail message is present when the event classifier 220 detects a record tone near the end of the phone call that does not align with a ringback, a long enough caller monologue occurs at the end of the call, trailing agent activity occurs, and a DTMF keypress occurs in close proximity.
3. A message was sent to voicemail but there is no message when the event classifier 220 detects that the record tone is near the end of the phone call and there is no caller activity immediately prior.
4. A voicemail message is present when the event classifier 220 detects no record tone but a long enough caller monologue occurs at the end of the phone call with low talkover.

The event classifier 220 may be programmed to apply a heuristic dialog analysis algorithm 222 to identify answered events, represented in answered call data 234, which are answered by a human agent using caller stream data 212 and agent stream data 216. An answered event is usually associated with a dialog event especially when the dialog event is before the first ringback. The event classifier 220 may identify the start of that first dialog as when the phone call is answered by choosing either the start of the first dialog or the end of the first ringback depending on whether there is talkover. The event classifier 220 applies four different scenarios to detect whether and when a phone call is answered by a human agent or not:

1. The event classifier 220 detects that the call is not answered by a human agent when there is excessive talkover.
2. The event classifier 220 is programmed, in response to determining that no ringbacks have occurred and the first dialog does not align closely with voicemail, the start of that first dialog is the time at which the phone call is answered.
3. The event classifier 220 is programmed, in response to determining that a dialog occurred before the first ringback, and there is no talkover, to select the start of the first dialog as the time at which the call was answered, and otherwise to select the end of the first ringback.
4. The event classifier 220 is programmed, if conditions (1.) to (3.) above are not satisfied, to select the end of the first ringback before the first dialog, unless there is no dialog, in which case the phone call was not answered by a human agent.

The event classifier 220 can be programmed to apply a heuristic dialog analysis algorithm 222 to identify dead air events and/or a ring count represented in dead air/rings count data 236 using caller stream data 212 and agent stream data 216. A dead air event is usually associated with a low decibel level of caller stream data 212 and agent stream data 216. For example, a dead air event occurs when the caller stream data 212 and the agent stream data 216 are silent with no events associated with dial tone, ringing, or the other party. For example, the event classifier 220 may identify a dead air event when the averaged maximum decibel level is below a predetermined threshold over a period of time. As one example, the event classifier could be programmed to identify a decibel level of "−100" over ten frames as representing dead air. Likewise, a rings count is characterized by the number of rings which is usually based on time in seconds. For example, a phone call is directed to voicemail after 20-25 seconds, usually four or five rings. The event classifier 220 may be programmed to identify a ringing count based on the number of repeated instances of a specified decibel level that is associated with a phone call ringing.

Furthermore, the event classifier 220 may be programmed to apply a heuristic dialog analysis algorithm 222 to predict features stored in the database 160 which are used to draw broader conclusions about the call, such as is it answered by a human agent and/or is it sent to voicemail. These features can be transmitted in predicted phone call service data 250 to a user to evaluate if there are other broad measures that are possible with this approach, such as how long is the phone call on hold or how many times is the phone call transferred.

4. Procedural Overview

In one embodiment, dialog analyzer 150 and/or event classifier 220 can be programmed to implement a computer-implemented method for analyzing whether a phone call is answered by an agent, the method comprising: receiving phone call audio data that represents the phone call; separating the phone call audio data into caller stream data and agent stream data that each includes a plurality of frames; measuring a decibel level for each frame; in response to measuring alternating groups of frames in the agent stream data and in the caller stream data that exceed a dialog decibel threshold, identifying a first key event comprising a dialog in the phone call audio data; in response to measuring decibel levels that exceed the dialog decibel threshold in corresponding frames in both the caller stream data and agent stream data, identifying a second key event comprising talkover in the phone call audio data; in response to identifying the dialog and if a level of talkover in the phone call audio data does not exceed a talkover threshold, identifying a third key event specifying that the call was answered by the agent. Examples of how to execute the identifying steps are described further in this section and have been described for FIG. 2.

Embodiments also can include, after identifying one or more key events in the phone call data, digitally storing, in a set of predicted phone call service data, a record that represents results of one or more of the first key event, second key event, and/or third key event, the record comprising a start value and an end value that delineate the one or more of the first key event, second key event, and/or third key event. For example, a key event can be delineated by a start frame value and an end frame value, so that the key event occurs in the phone call data between the frame values. Or, a key event can be delineated using time values. Records of key events can be stored in the database 160 and also can include decibel level values and/or other metadata pertaining to the identifying.

Figure 3:
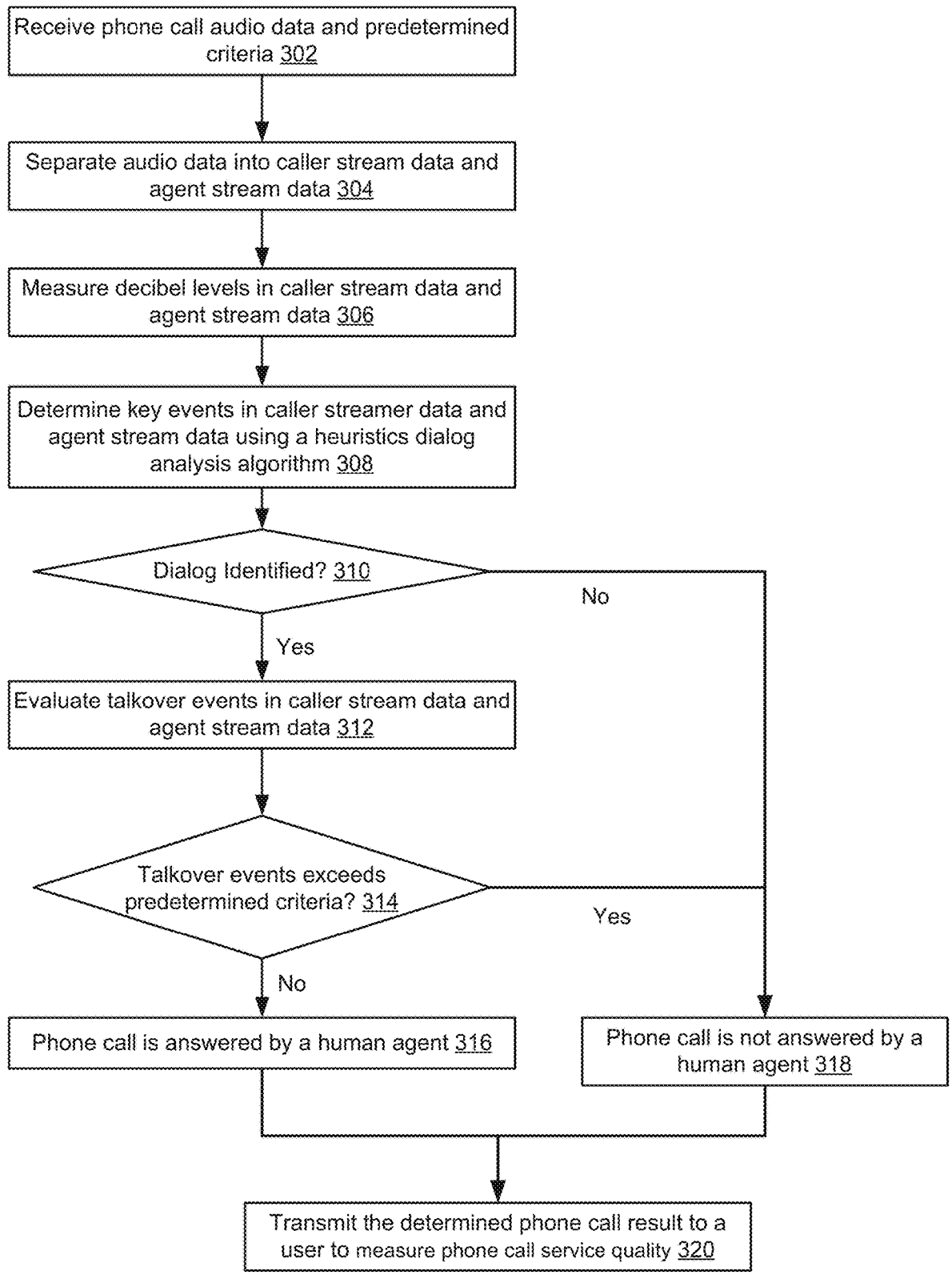
FIG. 3 illustrates an example computer-implemented method of determining key characteristics of a phone call in accordance with one or more embodiments.

FIG. 3 illustrates an example of a computer-implemented method of determining key characteristics of a phone call in accordance with one or more embodiments. FIG. 3 can be programmed to implement a general workflow to apply a plurality of heuristics to assess key characteristics of digitally stored audio representing a phone call and predict, among other things, whether and when the phone call is answered by a human agent. One or more blocks in FIG. 3 may be performed by one or more components as described in FIG. 1 and FIG. 2; for example, dialog analyzer 150 or event classifier 220 can be programmed, using one or more sequences of instructions, to execute an implementation of FIG. 3. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

FIG. 3 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In block 302, phone call audio data and predetermined criteria are received in accordance with one or more embodiments. For example, phone call audio data may be received by a phone call management system 100 as a digital packet stream representing audio signals or energy of a phone call. In particular, the phone call audio data may be received as separate caller and agent audio streams, or the phone call audio data may be received as a single data stream and separated into caller and agent audio streams. As another example, the predetermined criteria include the heuristics that are applied to detect various key characteristics of a phone call.

In block 304, the phone call audio data is separated into caller and agent audio streams in accordance with one or more embodiments. For example, the phone call audio data uses two streams per call, one for the caller and one for the agent. As another example, the phone call audio data may be separated into different sources using a convention stream data analysis technique.

In block 306, decibel levels are measured in caller stream data and agent stream data in accordance with one or more embodiments. For example, the phone call management system 100 calculates the decibel level of each frame using a RMS approach, producing values in the range "−127" to "0", with 0 being the highest possible volume. As another example, a decibel level value can be calculated for both the caller and agent audio streams for use in the dialog analysis.

In block 308, key events are determined in caller stream data and agent stream data using a heuristics dialog analysis algorithm in accordance with one or more embodiments. For example, the phone call management system 100 applies a heuristics dialog analysis algorithm to determine a ringback event, a dialog event, a talkover event, a record tone event, a voicemail event, a dead air event, and a rings count event based on the caller stream data and the agent stream data. The heuristics dialog analysis algorithm may be predetermined by previous experience or machine-learning algorithms through the analysis of a wide variety of phone calls. Likewise, the heuristics dialog analysis algorithm may update heuristics with flexibility to accurately detect different key events of a phone call.

In block 310, a determination is made whether a dialog event is identified in accordance with one or more embodiments. A dialog event is usually detected when a caller is talking long enough and loud enough with enough variance and agent is not talking. Where a dialog event is identified, the process may proceed to block 312. Where a dialog event is not identified, the process may proceed to block 318.

In block 312, talkover events are evaluated in caller stream data and agent stream data in accordance with one or more embodiments. Talkover is a measure of what percentage of time both parties are simultaneously at a high decibel level. The level of talkover is a strong indicator of a noisy phone call or the caller talking on the side to a third party. The phone call management system 100 identifies the start of that first dialog as when the phone call is answered by choosing either the start of the first dialog or the end of the first ringback depending on whether there is talkover.

In block 314, a determination is made whether talkover events exceed predetermined criteria in accordance with one or more embodiments. The phone call management system 100 applies different scenarios based on predetermined criteria to evaluate the level of talkover in the caller stream data and the agent stream data. For example, the phone call is not answered by a human agent when there is excessive talkover. As another example, the phone calls are answered when there is a dialog before the first ringback and there is no talkover. Where talkover events exceed predetermined criteria, the process may proceed to block 318. Where talkover events do not exceed predetermined criteria, the process may proceed to block 316.

In block 316, phone call is answered by a human agent in accordance with one or more embodiments. The phone call management system 100 determines the phone call is answered by a human agent.

In block 318, phone call is not answered by a human agent in accordance with one or more embodiments. The phone call management system 100 determines the phone call is not answered by a human agent. Therefore, the phone call is sent to voicemail.

In block 320, the determined phone call result is transmitted to a user to measure phone call service. For example, the phone call management system 100 uses the determined phone call result to trigger time-based phrase spotting, e.g., within 60 seconds after caller-agent interaction starts. As another example, the phone call management system 100 may combine other rules to determine what to do with the phone call in real time streaming fashion.

5. Implementation Example

Figure 4:
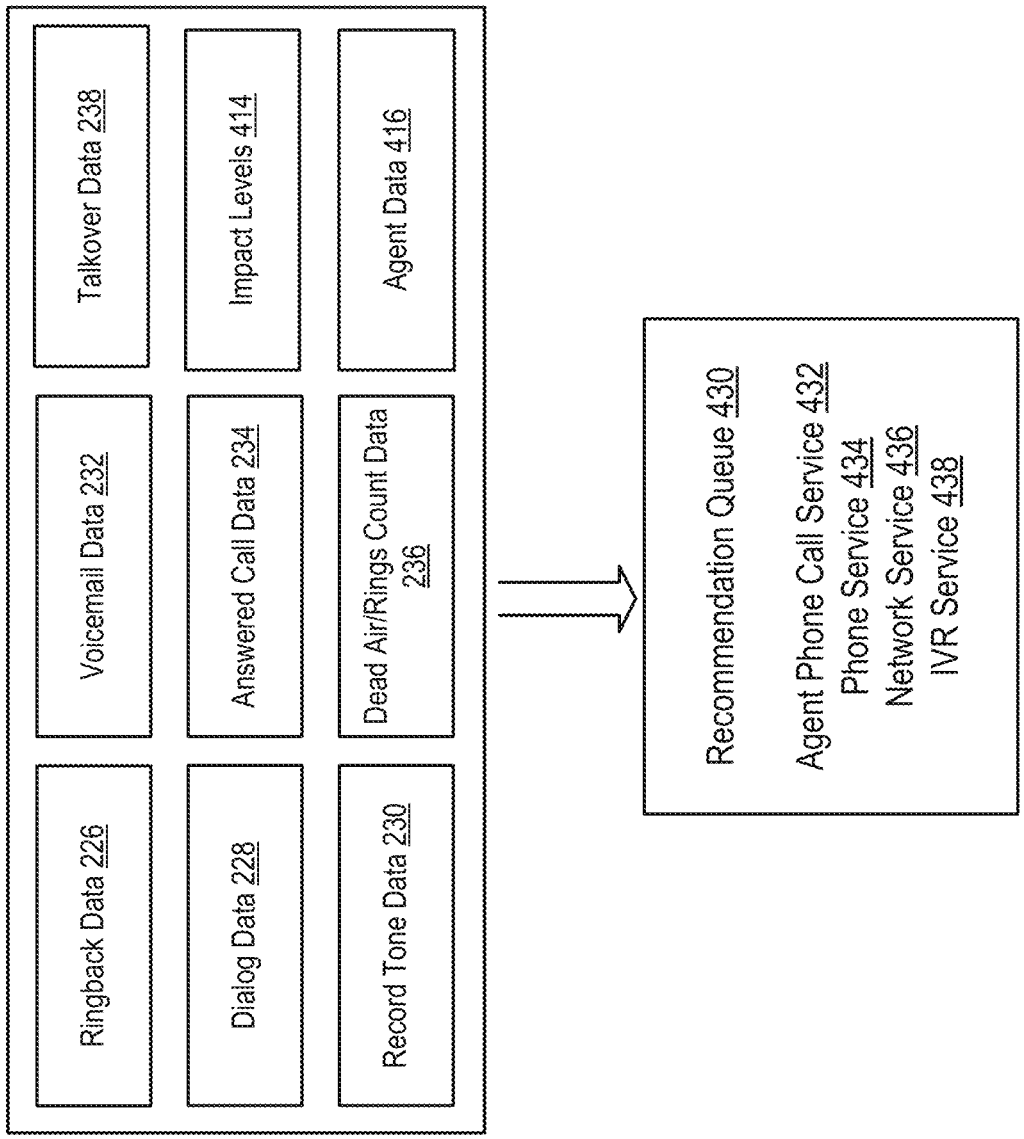
FIG. 4 shows an example of determining a recommendation queue in accordance with one or more embodiments.

FIG. 4 shows an example of determining a recommendation queue in accordance with one or more embodiments. In one embodiment, FIG. 4 shows an example of using key events of phone calls such as ringback data 226, dialog data 228, record tone data 230, voicemail data 232, answered call data 234, dead air/rings count data 236, and talkover data 238, as well as impact levels 414 and agent data 416 to make a recommendation queue 430 for a user.

In the example of FIG. 4, different key events of phone calls can correspond to different impact levels within an organization. In one embodiment, the dialog analyzer 150 is programmed to use the identified key events of phone calls and impact levels 414 with additional data such as agent data 416 to determine the service quality for different sources such as agents, phones, or a network. For example, an agent may provide less satisfactory phone call service when the agent has less answered call events and more dead air events and voicemail events. As another example, network may be down when there is no answered call events and voicemail events for a period of time. Likewise, a phone is malfunctional when there are no answered call events and there are only other key events such as ringback events, talkover events, record tone events, voicemail events, dead air events, and/or rings count events. An IVR system may not function when there are no voicemail events. As a result, the phone call management system 100 provides a recommendation queue 430 for a user to make decisions accordingly regarding whether to improve agent phone call service 432, phone service 434, network service 436, and IVR service 438.

6. Hardware Overview

Figure 5:
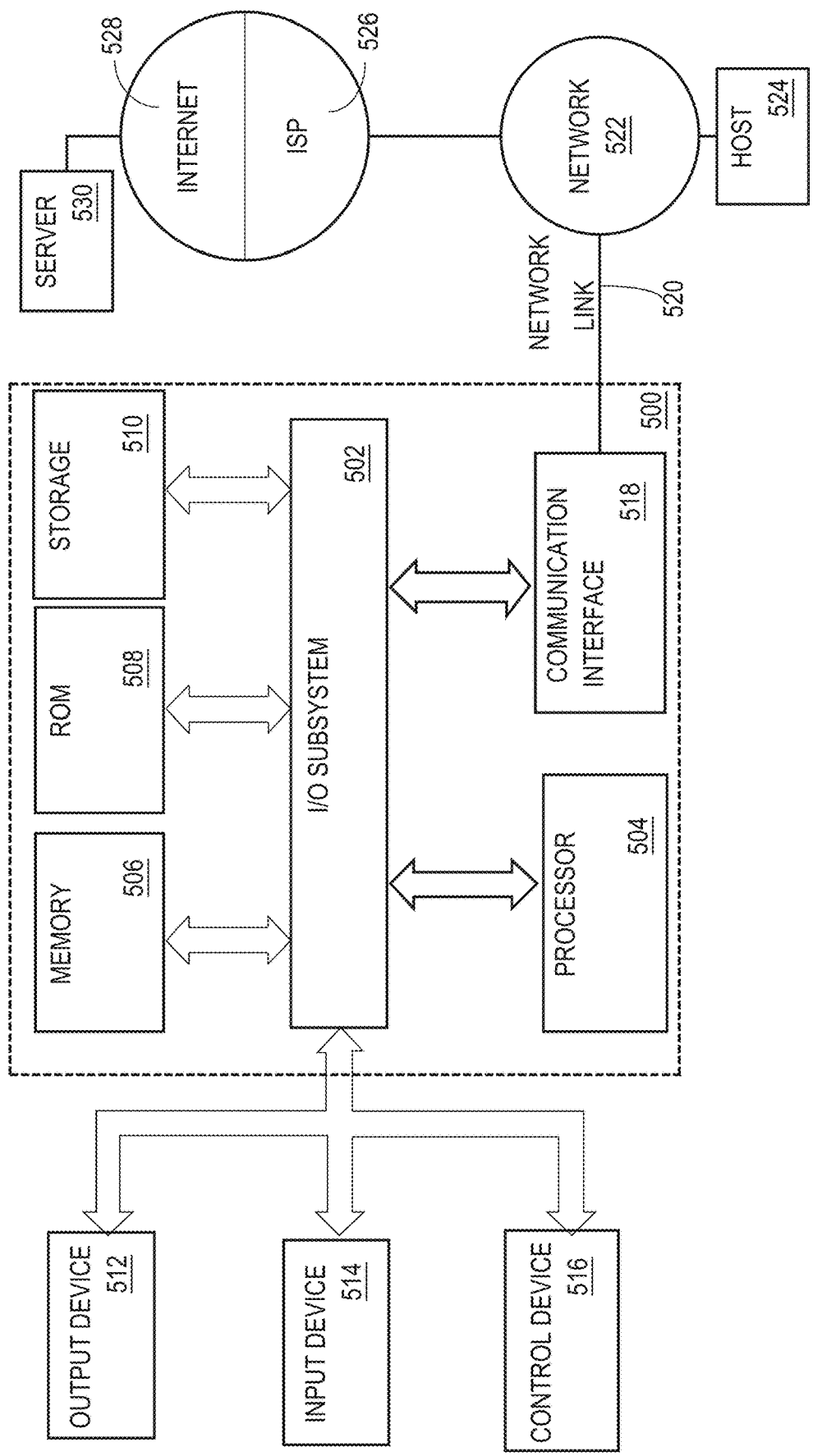
FIG. 5 shows a computer system in accordance with one or more embodiments.

In an embodiment, a distributed computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 5 illustrates only one of many possible arrangements of components configured to execute the programming described herein. Other arrangements may include fewer or different components, and the division of work between the components may vary depending on the arrangement.

FIG. 5, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Each set of heuristics, each description of a process or method, in whole or in part, and all other statements herein concerning algorithms or processes can be programmed in one or more stored control programs, functions, methods, programmatic objects, or other software elements. The description herein is intended to communicate at the functional level at which skilled persons, in the art to which this disclosure pertains, communicate with one another to describe and implement algorithms using programming. The description is not intended to state every instruction, method object or sub-step that would be needed to program every aspect of a working program, but is provided at the same functional level of illustration that is normally used at the high level of skill in this art to communicate the basis of developing working programs.

The methods described herein can be coupled to, or can conceptually power, a set of signals in a larger call data analysis platform. The signals can be combined using programmed rules. As an example, for instance, a user could program a signal such as "voicemail left is TRUE and needs appointment words said is TRUE". Information specifying that these signals have been received can be reported to the user as a "Missed Opportunity" or with another alert, notification, or label; end users may wish to use the output to optimize their call center performance, or detect if they need to call back an interested customer.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for analyzing whether a phone call is answered by an agent, the method comprising, executed using one or more computing devices:
   receiving phone call audio data that represents the phone call;
   separating the phone call audio data into caller stream data and agent stream data that each includes a plurality of frames;
   measuring a decibel level for each frame;
   in response to measuring an increase in decibel levels in the agent stream data to a decibel level that exceeds a ringback energy threshold and that has a transition duration that is less than a ringback transition threshold time, identifying a ringback in the phone call audio data;
   in response to measuring alternating groups of frames in the agent stream data and in the caller stream data that exceed a dialog decibel threshold, identifying a first key event comprising a dialog in the phone call audio data;
   in response to measuring decibel levels that exceed the dialog decibel threshold in corresponding frames in both the caller stream data and agent stream data, identifying a second key event comprising talkover in the phone call audio data;
   in response to identifying the dialog and if a level of talkover in the phone call audio data does not exceed a talkover threshold, identifying a third key event specifying that the call was answered by the agent;
   digitally storing, in a set of predicted phone call service data, a record that represents results of one or more of the first key event, second key event, and/or third key event, the record comprising a start value and an end value that delineate the one or more of the first key event, second key event, and/or third key event.

2. The computer-implemented method of claim 1, further comprising, in response to identifying the dialog and if no ringback has been identified, determining the call is answered by the agent at the start of the dialog.

3. The computer-implemented method of claim 1, further comprising, in response to identifying the dialog before the ringback in the phone call audio data and if no talkover has been identified, determining the call is answered by the agent at the end of the ringback.

4. The computer-implemented method of claim 1, further comprising, in response to identifying the dialog before the ringback in the phone call audio data and if talkover has been identified, determining the call is answered by the agent at the start of the dialog.

5. The computer-implemented method of claim 1, further comprising, in response to identifying the ringback before the dialog in the phone call audio data, determining the call is answered by the agent at the end of the ringback.

6. The computer-implemented method of claim 1, further comprising, in response to measuring decibel levels in the agent stream data that exceed a record tone energy threshold and that falls within a record tone duration range, identifying a record tone in the phone call audio data.

7. The computer-implemented method of claim 6, further comprising, in response to measuring decibel levels that exceed a high decibel threshold in the caller stream data and decibel levels that are less than a low decibel threshold in the agent stream data at the end of the call, determining the call is sent to voicemail.

8. The computer-implemented method of claim 1, further comprising, in response to measuring an additional increase in decibel levels in the agent stream data to a decibel level that exceeds a ringback energy threshold and that has a transition duration that is less than a ringback transition threshold time, identifying an additional ringback in the phone call audio data.

9. The computer-implemented method of claim 8, further comprising, in response to identifying the dialog between the ringback and the additional ringback, determining the phone call is transferred after being answered by an agent.

10. One or more non-transitory computer-readable storage media coupled to one or more processors and storing sequences of instructions for analyzing whether a voice call that occurred between the two parties is answered by an agent using only a voice energy level of recorded, digitally stored phone call audio data representing the voice call, which instructions when executed by the one or more processors, cause the one or more processors to:
receive the phone call audio data that represents the voice call;
separate the phone call audio data into caller stream data and agent stream data that each includes a plurality of frames;
calculate a decibel level for each frame;
in response to measuring an increase in decibel levels in the agent stream data to a decibel level that exceeds a ringback energy threshold and that has a transition duration that is less than a ringback transition threshold time, identify a ringback in the phone call audio data;
in response to measuring alternating groups of frames in the agent stream data and in the caller stream data that exceed a dialog decibel threshold, identify a dialog in the phone call audio data;
in response to measuring decibel levels that exceed the dialog decibel threshold in corresponding frames in both the caller stream data and agent stream data, identify talkover in the phone call audio data; and
in response to identifying the dialog and if a level of talkover in the phone call audio data does not exceed a talkover threshold, determine the call is answered by the agent.

11. The media of claim 10, wherein the instructions, when executed by the one or more processors, cause the one or more processors to execute: in response to identifying the dialog and if no ringback has been identified, determine the call is answered by the agent at the start of the dialog.

12. The media of claim 10, wherein the instructions, when executed by the one or more processors, cause the one or more processors to execute: in response to identifying the dialog before the ringback in the phone call audio data and if no talkover has been identified, determine the call is answered by the agent at the end of the ringback.

13. The media of claim 10, wherein the instructions, when executed by the one or more processors, cause the one or more processors to execute: in response to identifying the dialog before the ringback in the phone call audio data and if talkover has been identified, determine the call is answered by the agent at the start of the dialog.

14. The media of claim 10, wherein the instructions, when executed by the one or more processors, cause the one or more processors to: execute in response to identifying the ringback before the dialog in the phone call audio data, determine the call is answered by the agent at the end of the ringback.

15. The media of claim 10, wherein the instructions, when executed by the one or more processors, cause the one or more processors to execute: in response to measuring decibel levels in the agent stream data that exceed a record tone energy threshold and that falls within a record tone duration range, identify a record tone in the phone call audio data.

16. The media of claim 15, wherein the instructions, when executed by the one or more processors, cause the one or more processors to execute: in response to measuring decibel levels that exceed a high decibel threshold in the caller stream data and decibel levels that are less than a low decibel threshold in the agent stream data at the end of the call, determine the call is sent to voicemail.

17. The media of claim 10, wherein the instructions, when executed by the one or more processors, cause the one or more processors to execute:
in response to measuring an additional increase in decibel levels in the agent stream data to a decibel level that exceeds a ringback energy threshold and that has a transition duration that is less than a ringback transition threshold time, identify an additional ringback in the phone call audio data.

18. The media of claim 17, wherein the instructions, when executed by the one or more processors, cause the one or more processors to execute:
in response to identifying the dialog between the ringback and the additional ringback, determine a phone call is transferred after being answered by an agent.

19. A computer system, comprising:
a call processor that is communicatively coupled to an agent and configured to digitally store phone call data representing a phone call between a caller and the agent;
one or more processors that are communicatively coupled to the call processor and configured to obtain the phone call data from the call processor;
one or more non-transitory computer-readable storage media that are communicatively coupled to the one or more processors and storing one or more sequences of stored program instructions which when executed by the one or more processors cause the one or more processors to perform:
receiving phone call audio data that represents the phone call;
separating the phone call audio data into caller stream data and agent stream data that each includes a plurality of frames;
measuring a decibel level for each frame;
in response to measuring an increase in decibel levels in the agent stream data to a decibel level that exceeds a ringback energy threshold and that has a transition duration that is less than a ringback transition threshold time, identifying a ringback in the phone call audio data;

in response to measuring alternating groups of frames in the agent stream data and in the caller stream data that exceed a dialog decibel threshold, identifying a first key event comprising a dialog in the phone call audio data;

in response to measuring decibel levels that exceed the dialog decibel threshold in corresponding frames in both the caller stream data and agent stream data, identifying a second key event comprising talkover in the phone call audio data;

in response to identifying the dialog and if a level of talkover in the phone call audio data does not exceed a talkover threshold, identifying a third key event specifying that the call was answered by the agent;

digitally storing, in a set of predicted phone call service data, a record that represents results of one or more of the first key event, second key event, and/or third key event, the record comprising a start value and an end value that delineate the one or more of the first key event, second key event, and/or third key event.

20. The computer system of claim 19, further comprising, in response to identifying the dialog and if no ringback has been identified, determining the call is answered by the agent at the start of the dialog.

21. The computer system of claim 19, further comprising, in response to identifying the dialog before the ringback in the phone call audio data and if no talkover has been identified, determining the call is answered by the agent at the end of the ringback.

22. The computer system of claim 19, further comprising, in response to identifying the dialog before the ringback in the phone call audio data and if talkover has been identified, determining the call is answered by the agent at the start of the dialog.

23. The computer system of claim 19, further comprising, in response to identifying the ringback before the dialog in the phone call audio data, determining the call is answered by the agent at the end of the ringback.

24. The computer system of claim 19, further comprising, in response to measuring decibel levels in the agent stream data that exceed a record tone energy threshold and that falls within a record tone duration range, identifying a record tone in the phone call audio data.

25. The computer system of claim 24, further comprising, in response to measuring decibel levels that exceed a high decibel threshold in the caller stream data and decibel levels that are less than a low decibel threshold in the agent stream data at the end of the call, determining the call is sent to voicemail.

26. The computer system of claim 19, further comprising, in response to measuring an additional increase in decibel levels in the agent stream data to a decibel level that exceeds a ringback energy threshold and that has a transition duration that is less than a ringback transition threshold time, identifying an additional ringback in the phone call audio data.

27. The computer system of claim 26, further comprising, in response to identifying the dialog between the ringback and the additional ringback, determining the phone call is transferred after being answered by an agent.

* * * * *